United States Patent Office 3,579,370
Patented May 18, 1971

3,579,370
COMPOSITE LAYERED TETRAHALOETHYLENE STRUCTURE
John Oliver Punderson and Miguel Jacinto Roura, Wilmington, Del., assignors to E. I. du Pont de Nemours and Company, Wilmington, Del.
Continuation-in-part of abandoned application Ser. No. 687,691, Dec. 4, 1967. This application Oct. 1, 1969, Ser. No. 862,829
Int. Cl. B32b 27/08
U.S. Cl. 117—72          13 Claims

ABSTRACT OF THE DISCLOSURE

A coating is provided which is self-adherent to a surface of tetrahaloethylene polymer, e.g., polytetrafluoroethylene, to make the polymer surface either more printable or to serve as an adhesive for a coating, e.g., polyvinylidene fluoride, which protects the polymer surface. In one embodiment, the coating comprises a blend of 10 to 90 percent by weight of a copolymer of tetrafluorethylene hexafluoropropylene and the remainder, to total 100 percent, of polyvinylidene fluoride.

---

This application is a continuation-in-part of U.S. patent application Ser. No. 687,691, filed Dec. 4, 1967, by the same inventors and now abandoned.

This invention relates to the coating modification of and protection of tetrahaloethylene polymer surfaces and to the resultant laminates.

Certain applications involving the use of halocarbon resins make it desirable that the surfaces be modified or protected. For example, U.S. Pat. No. 3,352,714 to Anderson and Perkins discloses the etch and electrostatic discharge modifications of halocarbon polymer surfaces, with the result being to impart bondability of the treated surface to a protective coating of polyimide. In many many manufacturing operations, however, it is more desirable if the surface of the halocarbon polymer could be made bondable by coating material, rather than etching or electrostatic discharge.

The present invention provides a coating which is self adherent to halocarbon polymer surfaces and which renders such surfaces more printable and also which is capable of serving as an adhesive for coating of protective polymer. This coating material comprises a blend of 10 to 90 percent by weight of fusible perfluorocarbon polymer with complementarily, to total 100 percent, from 90 to 10 percent by weight of fusible hydrohalocarbon polymer.

The term "halo" used herein refers only to fluorine and chlorine. The term "fusible" means that the polymer has a low enough viscosity above its crystalline melting point and at the particular temperature employed to flow, free of pressure, into a smooth, coherent coating. Since each component of the blend is fusible, the blend itself has this character. The particular temperature employed will be such that the halocarbon polymer to be coated is not degraded.

The coating composed of the blend of fusible polymers imparts improved printability to the halocarbon polymer. In another embodiment of the present invention, this coating serves as an adhesive for a coating of protective polymer which, for example, can be polyvinylidene fluoride. The resultant composite layered structure has improved abrasion and cut-through resistance, as compared to the halocarbon polymer by itself.

These and other embodiments of the present invention will be discussed more fully hereinafter, with reference to the accompanying drawings, in which.

Figure 1:
FIG. 1 is a side cross-sectional view of a layer of halocarbon polymer.

With reference to the drawings, FIG. 1 shows a layer 2 of halocarbon polymer. Layer 2 can be in such forms as a self-supporting film, or as a surface of or a coating on a shaped article. The halocarbon polymer from which the layer is made is tetrahaloethylene polymer wherein preferably at least three of the ethylene halogen substituents are fluorine. The polymer includes chlorotrifluorethylene homopolymer and copolymer and tetrafluoroethylene homopolymer and copolymer and blends thereof. Generally less than 40 percent by weight of the monomer which is copolymerized with either chlorotrifluoroethylene or tetrafluoroethylene will be present. Examples of copolymers include the copolymer of tetrafluoroethylene/hexafluoropropylene, in which the hexafluoropropylene derived units account for from about 5 to about 35 percent by weight of the units of the copolymer, such as described in U.S. Pat. No. 3,085,083, to Schreyer and U.S. Pat. No. 2,946,763 to Bro et al., and the copolymers wherein the copolymerized monomer is higher perfluoroalkene e.g., containing from 4 to 10 carbon atoms, perfluoro(alkyl vinyl ether), such as perfluoro(propyl or ethyl vinyl ether), described in U.S. Pat. No. 3,132,123 to Harris et al., and perfluoro-(2-methylene-4-methyl-1,3-dioxolane) described in U.S. Pat. No. 3,308,107 to Selman et al. The highly fluorinated monomers, with a single hydrogen substituent remaining, 2-hydroperfluoroalkene of 3 to 10 carbon atoms, e.g., 2-hydropentafluoropropene, omegahydroperfluoroalkene of 3 to 10 carbon atoms and omegahydroperfluoroalkyl perfluorovinyl ether, the alkyl group having from 1 to 5 carbon atoms, can also be used to form the copolymerized monomer; the presence of the hydrogen atom does not significantly change the character of the coplymer from that of a perfluorocarbon copolymer. Generally, sufficient of the copolymerized monomer is present to render the tetrafluoroethylene melt fabricable; however, greater or less amounts may be present. Except for hexafluoropropylene, the amount of copolymerized monomer present will usually be from 1 to 15 percent by weight.

Figure 2:
FIG. 2 shows the layer of FIG. 1, but having a coating imparting improved printability thereto.

Normally, the surface of tetrafluoroethylene polymer, particularly that of the homopolymer, cannot be printed on, except by using special procedures involving the use of temperatures above the melting point of the tetrahalocarbon polymer, as disclosed in U.S. Pat. Nos. 3,011,916 and 3,018,188 to Nicoll. It has now been found that the coating composed of a blend of fusible polymer, to be described in detail hereinafter, will not only adhere to the surface of tetrahaloethylene polymer but that the exposed surface of the blend can be printed upon by the procedures in the Nicoll patents at lower temperatures, thus rendering the tetrahaloethylene polymer more printable. The resultant product, as shown in FIG. 2, is a composite layered structure of the layer 2 of tetrahaloethylene polymer and a layer 4 of the fusible polymer blend.

The fusible perfluorocarbon polymer component of the blend forming layer 4 includes tetrafluoroethylene/isobutylene copolymer and the same copolymers and blends thereof hereinbefore described for the tetrahaloethylene polymer layer 2, except that they are selected to form a fusible blend with the hydrohalocarbon polymer component. Also included in this category of polymers are copolymers of tetrafluoroethylene with highly fluorinated monomers hereinbefore described since the presence of the single hydrogen atom in these monomers does not change the character of the copolymer essentially from that of a perfluorocarbon polymer. Preferably, the fusible perfluorocarbon component is of a different copolymer composition and/or of a lower melt viscosity at the fusion temperature employed, than the polymer of layer 2.

The fusible hydrohalocarbon polymer component of the blend forming layer 4 includes such polymers as vinyl fluoride and vinylidene fluoride homopolymers and copolymers with each other or with at least one other halogen-substituted ethylenically unsaturated hydrocarbon monomer, preferably a perfluoroolefin of 2 to 3 carbon atoms, e.g., with hexafluoropropylene, such as described in U.S. Pat. No. 3,051,677 to Rexford and U.S. Pat. No. 2,968,649 to Pailthorp et al., or with tetrafluoroethylene, such as described in Natta et al., "Isomorphism Phenomena in Systems Containing Fluorinated Polymers and in New Fluorinated Copolymers," J. Polymer Sci., 3 4263–4278 (1965); vinyl and vinylidene chloride homopolymer and copolymers; copolymers of tetrafluoroethylene with ethylene and alkyl-perfluorovinyl ether, particularly methyl-perfluorovinyl ether; and blends thereof.

Preferred blend compositions include those containing from 30 to 70 percent by weight of the fusible perfluorocarbon polymer component and complementally, to total 100 percent, from 70 to 30 percent by weight of hydrohalocarbon polymer component. Either or both of these components can contain other ingredients mixed therewith, such as the normal compounding additives, e.g., stabilizers, antioxidants, pigments, filler and/or surface active agents. Also present can be additives which promote the film-forming ability (improve the coherency of the resultant layer) of one or more of the hereinbefore described polymer components of the blend, which can be called film-forming agents, and are present in an amount which brings about improvement, i.e., an effective amount, which amount depends on the particular polymer used and particular agent used. Generally, no greater than 30 percent by weight of film-forming agent based on the weight of the polymer components of the blend would be used. Representative film-forming agents include silicone resins and acrylate polymers.

Any method of forming the coating 4 on the layer 2 can be employed. For example, the blend can be in the form of a film which is brought into contact with the layer 2 and which is then heated to at least the fusion temperature of the blend, and preferably to the crystalline melting point of the polymer of layer 2, whereupon the film, forming layer 4, adheres to the layer 2. This adherence is demonstrated by the inability of the coating to be peeled as a thin strip from the surface of layer 2. Another method is to contact the layer 2 with the blend contained in a volatile inert liquid carrier in such forms as a solution or as a dispersion in an aqueous meduim or in an organic liquid (organosol) or mixtures thereof. After the contacting step, the liquid carrier is evaporated and its residue containing the blend is heated to at least the fusion temperature of the blend and preferably to the crystalline melting point of the polymer of layer 2. The resultant coating forming layer 4 is similarly adhered to layer 2. Crystalline melting points referred to herein are the lowest equilibrium temperatures at which the X-ray patterns characteristic of crystalline structure disappear.

Methods for making dispersions of the blend forming layer 4 and the dispersions themselves and their characteristics, which are useful in the present invention, are disclosed, for example, in U.S. patent application Ser. No. 654,333, filed July 19, 19677 by J. C. Fang, now abandoned (Belgian Pat. No. 718,343). The individual polymer components of the blend may be formed into a dispersion while together, or can be formed into separate dispersions which are thereafter mixed together. U.S. Pat. Nos. 3,324,069 to Koblitz et al., and 3,340,222 to Fang disclose inter alia organosols of vinylidene fluoride homopolymer and copolymer in volatile organic solvent which has acrylate polymer dissolved therein for improved film-forming character, which are suitable for use in the present invention. Such dispersions can be mixed in amounts to provide the solids composition desired, with the tetrafluoroethylene/hexafluoropropylene copolymer organosols described in Ser. No. 654,333. The polymer particles in these organosols generally have an average radius of about 0.01 to 3 microns, with no more than 50 percent by weight of the particles having radii of larger than 3 microns. Upon evaporation of the solvent, the acrylate polymer remains in the blend. Examples of acrylate polymer include alkyl acrylate and alkyl methacrylate homopolymers, e.g., methyl methacrylate, and copolymers with each other and minor amounts of other copolymerizable monomers such as 3-(beta-methacryloxyethyl-2,2-spirocyclohexyl-oxazolidine).

The layer 4 resulting from the fusion of the blend can be printed upon at lower temperatures than the layer 2, using the stamping apparatus described in U.S. Pat. No. 3,018,188. For example, where the layer 2 is polytetrafluoroethylene, the stamping apparatus must be heated to about 430° C. and when the layer 2 is a copolymer of tetrafluoroethylene with 16 percent by weight of hexafluoropropylene, having a crystalline melting point of 261° C. and melt viscosity of about $7 \times 10^4$ poises at 380° C., (as measured by the procedure disclosed in U.S. Pat. No. 2,946,763 to Bro et al.), a stamping apparatus temperature of about 340° C. is required. In contrast, when the layer 2 is coated to a thickness of 0.1 to 0.2 mil with the blend of tetrafluoroethylene/hexafluoropropylene with polyvinylidene fluoride described in Example 1 herein, a stamping apparatus temperature, using polyvinylidene fluoride printing foil, of only about 260° C. at 13–15 p.s.i. stamp pressure, is required. The resultant printing on the coating has a penetration of about 0.5 mil and satisfies the durability test set forth in MIL–W4.7.4.20. The temperature of the stamp in these experiments is about 25° C. less than the temperature of the stamping apparatus.

Figure 3:
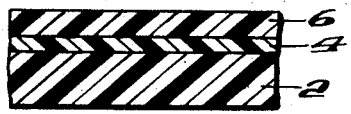
FIG. 3 shows the layer of FIG. 1, but with the coating of the layered structure of FIG. 2 being used to secure a protective coating to the layer of FIG. 1.

In another embodiment of the present invention, the layer 4 serves as an adhesive for an adherent coating 6 of protective polymer to form the composite layered structure of FIG. 3. The coating 6 serves to impart properties to the layer 2 of tetrahaloethylene polymer, which increase the effectiveness of the latter in certain applications. For example, the protective polymer can be one which has better mechanical properties such as cut-through resistance and abrasion resistance, than layer 2. The particular protective polymer used will depend on the particular modifying or protective effect desired for the layer of tetrahaloethylene polymer. Exemplary of protective polymers are the polyamides, e.g., 66 nylon, 610 nylon, 6 nylon and copolymers thereof, tetrafluoroethylene/ethylene copolymer, the polysulfones such as described in Plastics Engineering 117, 118 (1965), vinylidene fluoride homopolymer and copolymer and the polyimides, such as those disclosed in U.S. Pat. No. 3,179,634 to Edwards and in U.S. Pat. No. 3,352,714 to Anderson et al., including the modified polyimides such as the polyimide-esters and the polyamide-imides described in U.S. Pat. No. 3,238,181 to Anderson, U.S. Pat. Nos. 3,260,691 and 3,347,828 to Stephens et al., U.S. Pat. No. 3,274,159 to Kliuber., British Pat. Nos. 1,026,032 and 1,082,186 and U.S. Pat. No. 3,293,248 to Shefier.

For most protective polymers the adherent layer 6 can be formed by the same methods as discussed for the formation of the layer 4. For coating with tetrafluoroethylene/ethylene copolymer, solutions and dispersions can be made by the procedures disclosed in Example 1 of U.S.

Pat. No. 2,468,664 to Hanford et al. In the case of polyimides, they will generally be applied in the form of polyimide precursor dissolved in volatile inert organic liquid, this liquid being then evaporated, and the residue heated. For some polyimides, this heating does not fuse the polymer, but instead coalesces it into solid aggregate form. The heating has a two-fold purpose, to convert the polyimide precursor to polyimide and to fuse or to coalesce the protective polymer to cause adherence between layer 4 and layer 6. Thus, the layer 4 serves as an adhesive for securing the coating forming layer 6 of protective polymers to the layer 2 of tetrahaloethylene polymer. Exemplary of a resultant composite layered structure under this embodiment is the one wherein layer 2 is tetrafluoroethylene/hexafluoropropylene copolymer, layer 4 is a blend of polyvinylidene fluoride with tetrafluoroethylene/hexafluoropropylene copolymer and layer 6 is polyvinylidene fluoride.

Figure 4:
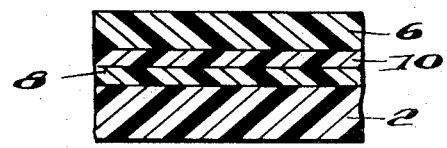
FIG. 4 shows another embodiment of protectively coating tetrahaloethylene polymer in which two layers of adhesive are employed.

This adhesive shown as a single layer 4 in FIG. 3 can be present in more than one layer, such as layers 8 and 10 shown in FIG. 4. One purpose in using more than one layer for gluing is to cause the adhesive to build up in thickness where the method of application of the adhesive results in a coating of less than desired thickness. More frequently, however, the purpose of using more than one layer of adhesive blend is to enhance the adhesion between the layer 2 and the layer 6. For this purpose, the composition of each adhesive layer need not be the same, but can be different in order to form a gradation or transition between the composition of the tetrahaloethylene polymer layer 2 and the layer 6 of protective polymer. For example, the layer 8 can be rich in the tetrahaloethylene polymer which is present in the layer 2, and the layer 10 can be rich in the particular polymer that is present in the layer 6 or in the next succeeding layer.

In a variation on the embodiment depicted in FIG. 4, when the layer 2 consists of tetrafluoroethylene homopolymer, it is sometimes desirable to have the first coating, i.e., coating 8, be of tetrafluoroethylene/hexafluoropropylene polymer entirely. The method of bonding this copolymer to polytetrafluoroethylene is described in U.S. Pat. No. 2,833,686 to Sandt. The second layer 10 can then be of the blends hereinbefore described with respect to the composition of layer 4.

When more than one adhesive layer and/or layer of protective polymer is employed, the first layer can be applied and fused to the layer 2, followed by the application and fusing of the second layer and so on, or the first and subsequent layers can be successively applied and then all fused to one another and the first layer to layer 2 at one time. Which technique is employed will depend on the form of the adhesive and protective polymer when it is first applied, i.e., whether it is a solid or a solid in a liquid carrier, and on the relative fusion temperatures. Throughout the application of the adhesive layer(s) and the layer of protective polymer it is generally desired that the heating required for fusion or coalescence and for adherence generally decreases from the first or innermost adhesive layer to the outermost layer of protective polymer. The use of a first adhesive layer of a copolymer of tetrafluoroethylene/hexafluoropropylene enables the blend layer (e.g., layer 4) to adhere to the composite layered structure at somewhat lower temperatures than if the blend layer were applied directly to a layer 2 consisting of tetrafluoroethylene homopolymer.

Figure 5:
FIG. 5 shows still another embodiment for protectively coating tetrahaloethylene polymer, in which three layers of adhesive are employed.

In another embodiment of the present invention, as shown in FIG. 5, a plurality of layers of protective polymer are used, such as inner layer 12 of protective polymer, and outer layer 14 of protective polymer. Again, one purpose of this variation can be to build up the thickness of protective polymer. Another purpose can be to use an outer layer 14 of protective polymer, which has particularly desirable properties, but which is somewhat less adherent to the blend of layer 10 used as an adhesive than desired. Exemplary of a system employing the structure of FIG. 5 is the one wherein layer 2 is tetrafluoroethylene homopolymer, layer 8 is a copolymer of tetrafluoroethylene/hexafluoropropylene, layer 10 is a blend such as disclosed for layer 4 of FIG. 2, and especially polyvinylidene fluoride blended with tetrafluoroethylene/hexafluoropropylene copolymer, layer 12 is polyvinylidene fluoride or a copolymer thereof with another monomer such as tetrafluoroethylene, to raise the melting point of layer 12, and layer 14 is polyimide.

The thicknesses of the layers 4, 6, 8, 10, 12 and 14 applied to the layer 2 of tetrahaloethylene polymer will depend on their intended purpose. Generally, however the thicknesses of each layer will be on the order of from 0.01 mil to 2 mils.

Figure 6:
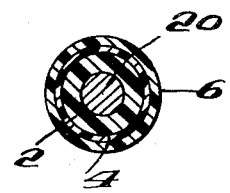
FIG. 6 shows a cross-section of an electrical conductor containing tetrahaloethylene polymer which is protectively coated according to the present invention.

The foregoing described embodiments for protectively coating tetrahaloethylene polymer are particularly useful for coatings of such polymer on electrical wire, such as shown in FIG. 6, wherein the numbering for FIG. 3 is used for wire 20 and wherein the layer 6 of protective polymer forms a jacket for the electrical wire. An efficient process results when the adhesive and protective polymers are successively applied on wire running through a series of baths, with such drying and/or fusing as may be necessary being carried out between baths. When the protective polymer is polyimide and is applied in the form of one of its precursors, such as polyamide-acid, sufficient heating after bath application may be necessary to chemically convert (cure) the precursor to the polyimide.

Examples of protectively coated composite layered structures of the present invention are as follows; parts and percents are by weight unless otherwise indicated.

EXAMPLE 1

Silver plated, 19 strand AWG 22 copper wire insulated with .010 inch (wall thickness) of polytetrafluoroethylene (PTFE) was run through a bath containing a dispersion of tetrafluoroethylene/hexafluoropropylene copolymer (FEP) in a mixture of methyl isobutyl ketone and butyl carbitol (about 20 percent solids) wherein the copolymer contains 16 percent hexafluoropropylene and has a melt viscosity of about $7 \times 10^4$ poises at 380° C. and wherein about 5 percent, based on the weight of the FEP, of a copolymer of methyl methacrylate with 5 percent of the oxazolidine compound hereinbefore described is dissolved in the methyl isobutyl ketone-butyl carbitol solvent mixture. The coated wire was then run upward into a 15 ft. vertical oven having a 13.5 ft. heated zone with a temperature profile ranging from 150° C. at the bottom to 375° C. at the top. The wire speed was 13.5 ft./min. An FEP coating of 0.0001–0.0002 inch thick was obtained.

The coated wire was then run through a second bath containing a mixture of 40 parts by weight of the dispersion described for the first bath with 60 parts by weight of a dispersion (about 25 percent solids) of polyvinylidine fluoride (PVF$_2$) in butyl carbitol having dissolved therein about 20 percent based on the weight of the PVF$_2$ of the acrylate copolymer described for the first bath. The twice coated wire was then passed through a 15 ft. vertical oven with a 150–375° C. temperature profile at the rate of 13.5 ft./min. The two-layer adhesive coating was 0.0002–0.0003 inch thick.

The twice-coated wire was then passed through a third bath containing a 17 percent solution in N-methyl 2-pyrrolidone of the polyamide-acid of the reaction product of pyromellitic dianhydride with 4,4' - diaminodiphenyl ether. From the bath the wire went through a coating die of 0.595 inch inside diameter which removed excess solution and from there into a vertical oven set at 190–280° C. where the remaining solution is dried and partially cured, to partially convert to polyimide, for 1 minute. A second coat of the same solution was placed over the first and is further dried and cured at 194–240° C.

followed by a post cure at 250° C. for half an hour to convert all the polyamide-acid to polyimide. The total wall thickness of the polyimide jacket after the postcure was 0.0007–0.0008 inch.

The adherence of this polyimide jacket to the adhesive layer was demonstrated by the good mechanical properties of the wire. Cut-through resistance was measured by the test wherein the wire was placed on a flat metal block and subjected to pressure of a cutting edge of 1/16 inch radius loaded at a rate of 10 kg./min. The load at which electrical contact was made between the wire and either the cutting edge or the metal block was found to be 25 kg. Unjacketed (PTFE coating only) wire showed cut-through values of 10–15 kg. The wire could be flexed repeatedly in the same spot without cracking the jacket. The wire could also be wrapped around a 1/4 inch mandrel and heat aged for 120 hours at 225° C. with a 3/4 lb. weight load without cracking the jacket. This performance was similar to that shown by wires in which the polyimide jacketing was applied over a PTFE wire coating that had been sodium etched.

EXAMPLE 2

The procedure of Example 1 was repeated except that the FEP in the first and second coating steps had 21 percent hexafluoropropylene instead of 16 percent and the FEP had a melt viscosity of $0.8 \times 10^4$ poises at 280° C. and a crystalline melting point of 225° C. as measured by DTA; the temperature profile for the second coating step was 150 to 300° C. and the partial curing of the polyamide-acid was done at a profile of 190 to 230° C. The results were essentially the same.

This example was repeated except that the base wire was insulated with 0.010 inch of polychlorotrifluoroethylene (CTFE). The first and second coating steps were carried out with an oven temperature of 250° C. and the partial curing of the polyamide-acid was accomplished at 200° C. The coating could not be readily peeled off.

EXAMPLE 3

The procedure of Example 2 was repeated except that wire with an 0.005 inch PTFE insulation was used with a coating die of 0.52 inch inside diameter. The results are essentially the same except that the cut-through resistance (21 kg.) and other mechanical and electrical properties affected by the thickness of the insulation were moderately reduced.

EXAMPLE 4

Silver plated, 19 strand copper AWG 22 wire insulated with .006 inch of a copolymer of tetrafluoroethylene with 16 percent of hexafluoropropylene was run through a bath containing the FEP/PVF$_2$ dispersion of Exampe 2 and into a 15 ft. vertical oven set at 300° C. throughout its length, at a rate of 13 ft./min. This single adhesive coat had a wall thickness of 0.0001–0.0002 inch.

The adhesive coated wire was then passed through a second bath containing the polyamide-acid solution of Example 2 and then through a coating die of 0.52 inch inside diameter to remove excess solution, and from there into a vertical oven set at 190–240° C. where the solution was dried and partially cured for 1 minute. A second coat of the same solution was placed over the first. Further curing (postcure) of the enamel was done at 240° C. for half an hour in a circulating air oven. The total wall thickness of the polyimide jacket after the postcure was 0.0007–0.0008 inch. The results were essentially the same as described for Example 3.

EXAMPLE 5

The procedure of Example 4 was repeated except that a 0.010 inch FEP insulation was used, and the FEP/PVF$_2$ adhesive layer was coated with the PVF$_2$ dispersion (15 percent solids) described in Example 1 and dried and fused to give a second layer of 0.0002–0.0003 inch in thickness. Two coats of polyimide-acid placed on top of the PVF$_2$ layer were dried and partially cured at 200° C. After 17 hours of postcure at 200° C. the adhesion and cut-through resistance were essentially the same as those of Example 1.

EXAMPLE 6

The procedure of Example 5 was repeated except on a 0.006 inch FEP insulation and the PVF$_2$ dispersion used to form the first adhesive layer is replaced by a hexafluoropropylene/vinylidene fluoride copolymer, and the first coating bath was made up with 70 parts FEP dispersion and 30 parts hexafluoropropylene/vinylidene fluoride dispersion. The PVF$_2$ coating (second coating of Example 5) was applied from a 35 percent solids dispersion. Adhesion of the polyimide jacket was good.

EXAMPLE 7

The procedure of Example 4 was repeated except on a 0.01 inch FEP insulation. The first adhesive coat was done with a bath of a mixture of 35 parts of the FEP dispersion of Example 1, 15 parts of the hexafluoropropylene/vinylidene fluoride dispersion of Example 6, and 50 parts of the PVF$_2$ dispersion of Example 1. The polyimide jacket showed good adhesion.

EXAMPLE 8

Silver plated, 19 strand copper AWG 22 wire insulated with 0.006 inch of FEP was run through a bath of the makeup used in the second coating of Example 2 and into a 15 ft. vertical oven set at 300° C. throughout its length, at the rate of 13 ft./min. The adhesive coat was 0.0001–0.0002 inch thick.

The wire was then given two passes through a bath containing the PVF$_2$ dispersion described in Example 1 and after each pass into the above oven set at the same temperature. A jacket approximately 0.0009 inch thick of PVF$_2$ was obtained and was well adhered to the adhesive layer; the jacket could not be peeled off. Cut-through was 25 kg. The wire could be flexed, bent and wrapped around its own diameter without cracking the jacket.

When the adhesive coating is omitted, the PVF$_2$ jacket can be readily peeled from the FEP insulation.

EXAMPLE 9

The procedure of Example 8 was repeated except that the wire had a 0.010 inch insulation of FEP. Similar results were obtained.

EXAMPLE 10

The procedure of Example 4 was repeated except the wire was jacketed with "Isomid," Schenectady Chemical Company's polyimide-ester resin (believed to be a solution in cresylic acid of the reaction product of trimellitic dianhydride, 4,4'-diaminodiphenylmethane, dimethyl terephthalate, ethylene glycol, tris(2-hydroxyethyl) isocyanurate "Mondur SH" (blocked isocyanate) and tetraoctyl titanate), using a 200–340° C. oven temperature profile. The polyimide-ester jacket adhered well to the outer adhesive layer.

EXAMPLE 11

The procedure of Example 4 was repeated except that Amoco's AI–10 polyamide-imide (believed to be a solution in N-methyl 2-pyrrolidone containing hydrocarbon solvent and the reaction product of the acid chloride of trimellitic dianhydride and 4,4'-diaminodiphenylmethane), 23 percent solids, enamel was used to form the polyimide jacketing. The results were essentially the same.

EXAMPLE 12

The procedure of Example 4 was repeated except that an enamel made of 16 percent polysulfone ("Bakelite" 3500) in N-methyl 2-pyrrolidone was used to form the protective coating. The wire could be flexed and wrapped around its own diameter without cracking the polysulfone protective jacket.

EXAMPLE 13

A coating of the FEP-PVF$_2$ mixed organosols of Example 2 was applied to a surface of polytetrafluoroethylene film measuring 0.005 inch thick (made by skiving) and leveled. The coated film was then baked for 5 minutes at 375° C. in an air oven. The resultant coating was 0.0002 inch thick and adhered well to the PTFE film as indicated by the coating not being peelable from the PTFE. PVF$_2$ organosol used in Example 1 was applied to the exposed surface of the fused FEP/PVF$_2$ coating and heated at 300° C. to obtain a fused PVF$_2$ protective coating which had similar adherence to the adhesive coating. A coating of the FEP-PVF$_2$ mixed organosols of Example 2 was applied to a surface of FEP film 0.005 inch thick and leveled and baked at 300° C. for 5 minutes to give a well adhered coating to th FEP film, which can be protectively coated in the same way.

EXAMPLE 14

This example is directed to the application of a layer of the blend of fusible perfluorocarbon polymer with fusible hydrohalocarbon polymer hereinbefore described as making up layer 4 to the exterior of coating 6 of protective polymer for the purpose of rendering the coating 6 more printable and/or for coloring the coating 6 particularly when the protective polymer is polyimide.

A dispersion was made containing 16.6 parts of FEP having the properties listed in Example 2, 13.7 parts of polyvinylidene fluoride, 3.0 parts of the acrylic copolymer of Example 1, 9.8 parts of TiO$_2$ white pigment, and 107 parts of a solvent mixture of 29 parts of methyl isobutyl ketone, 29 parts of butyl carbitol, 17 parts of butyrolactone, 17 parts of isophorone, and 15 parts of a hydrocarbon solvent mixture designated as Solvesso 150. This dispersion was ball milled for 24 hours in a porcelain jar containing porcelain balls. The dispersion was applied as a coating to AWG 22 wire coated with the composite layered structure (fused) of FIG. 4, with the outer layer of protective polymer being polyimide. The coating method was to dip the wire containing the coating system of FIG. 4 into the dispersion at a wire speed of 10 ft./min., with the resultant coating of dispersion being dried and fused by passage through a vertical oven with 13.5 ft. of heated zone at 315° C. A second coat of dispersion was applied in the same way to give a smooth white coating of approximately 0.0007 inch thickness. This imparted improved visibility and superior printing characteristics to the wire.

EXAMPLE 15

The polyimide wire jacket applied in the manner disclosed in U.S. Pat. No. 3,352,714 to Anderson and Perkins can also be coated with the blend making up layer 4, such as by the method of Example 13 herein, for the same purpose. Thus, for example, a silver-plated 19 strand AWG 22 copper wire was coated with 0.010 inch (wall thickness) of PTFE, which, in turn, was chemically etched and then coated with 0.0005 inch of polyimide by the procedure described in the Anderson and Perkins patent. The dispersion and coating procedure of Example 4 was repeated on the polyimide-coated wire of this example, and the resultant "paint" imparted improved visibility and superior printing characteristics to the wire.

It is to be understood that this invention is not limited to these specific embodiments thereof except as defined in the appended claims.

What is claimed is:

1. A composite layered structure comprising a layer of tetrafluoroethylene or chlorotrifluoroethylene polymer and adherent thereto a layer of a belnd of 10 to 90 percent by weight of a fusible perfluorocarbon polymer with, complementally to total 100 percent, from 90 to 10 percent by weight of fusible hydrohalocarbon polymer, each said layer being fused.

2. The composite layered structure of claim 1 and a fused or coalesced layer of protective coating polymer adhered to the outer surface of the blend layer.

3. The composite layered structure of claim 2 wherein the protective coating polymer is polyimide.

4. The composite layered structure of claim 2 wherein the protective coating polymer is vinylidene fluoride polymer.

5. The composite layered structure of claim 4 and a fused or coalesced layer of polyimide adhered to the outer surface of the layer of vinylidene fluoride polymer.

6. The composite layered structure of claim 5 wherein said first mentioned polymer is polytetrafluoroethylene.

7. The composite layered structure of claim 6 wherein a fused layer of tetrafluoroethylene/hexafluoropropylene copolymer is interposed between and adhered to the layer of polytetrafluoroethylene and the blend layer.

8. The composite layered structure of claim 2 and a fused layer of said blend adhered to the outer surface of the layer of protective coating polymer.

9. The composite layered structure of claim 8 wherein the protective coating polymer is polyimide.

10. The composite layered structure of claim 1 wherein said first mentioned polymer is tetrafluoroethylene/hexafluoropropylene copolymer.

11. The composite layered structure of claim 1 wherein said blend contains up to 30 percent by weight based on the weight of the blend of acrylate polymer.

12. The composite layered structure of claim 1 wherein said perfluorocarbon polymer is tetrafluoroethylene/hexafluoropropylene copolymer and said hydrohalocarbon polymer is polyvinylidene fluoride and said blend contains an effective amount of silicone resin or acrylate polymer film-forming agent.

13. The composite layered structure of claim 1 and a layer of polyvinylidene fluoride containing an effective amount of silicone resin or acrylate polymer film-forming agent adhered to the outer surface of the blend layer.

References Cited

UNITED STATES PATENTS

| | | | |
|---|---|---|---|
| 2,774,704 | 12/1956 | Smith | 117—138.8(UF)X |
| 2,833,686 | 5/1958 | Sandt | 156—309 |
| 2,998,332 | 8/1961 | Osdal | 117—138.8(UF)X |
| 3,011,916 | 12/1961 | Nicoll | 117—138.8(UF) |
| 3,018,188 | 1/1962 | Nicoll | 117—38.8(UF)X |
| 3,108,086 | 10/1963 | Russell et al. | 117—138.8(UF)X |
| 3,422,215 | 1/1969 | Humes | 117—218X |

WILLIAM D. MARTIN, Primary Examiner

R. HUSACK, Assistant Examiner

U.S. Cl. X.R.

117—75, 76, 138.8, 161, 218